(12) United States Patent
Singh et al.

(10) Patent No.: US 12,079,099 B2
(45) Date of Patent: Sep. 3, 2024

(54) MANAGING VIRTUAL APPLICATION PERFORMANCE IN A VIRTUAL COMPUTING ENVIRONMENT

(71) Applicant: Citrix Systems, Inc., Fort Lauderdale, FL (US)

(72) Inventors: Vikramjeet Singh, Bangalore (IN); Mukesh Garg, Bangalore (IN); Rahul Gupta, Bangalore (IN); Rishabh Agarwal, Bangalore (IN); Mahesh Vangapalli, Bangalore (IN); Vivek Koni Raghuveer, Bangalore (IN); Venkatesh Vellingiri, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 673 days.

(21) Appl. No.: 17/189,675

(22) Filed: Mar. 2, 2021

(65) Prior Publication Data

US 2022/0283830 A1 Sep. 8, 2022

(51) Int. Cl.
*G06F 11/30* (2006.01)
*G06F 9/455* (2018.01)
*G06F 11/34* (2006.01)

(52) U.S. Cl.
CPC ............ *G06F 11/301* (2013.01); *G06F 9/455* (2013.01); *G06F 11/302* (2013.01); *G06F 11/3409* (2013.01); *G06F 11/3438* (2013.01); *G06F 2201/815* (2013.01); *G06F 2201/865* (2013.01)

(58) Field of Classification Search
None
See application file for complete search history.

(56) References Cited

U.S. PATENT DOCUMENTS

| 2017/0039200 | A1* | 2/2017 | Galkin | G06F 16/24578 |
| 2017/0052870 | A1* | 2/2017 | Shuvali | G06F 11/3438 |
| 2022/0060566 | A1* | 2/2022 | Donohue | G06F 3/14 |

* cited by examiner

*Primary Examiner* — Qing Yuan Wu

(57) ABSTRACT

Systems and methods of managing virtual application performance in a virtual computing environment are provided. A system determines an application interaction score based on corresponding application interaction factors associated with sessions. The system determines the application interaction score for each virtual application accessed during each of the sessions. The system generates an aggregated application interaction score for each of the sessions based at least on combining the application interaction score for each of the virtual applications accessed during a corresponding session. The system performs an action based at least in part on the aggregated application interaction score to improve performance of a virtual application accessed via the virtual computing environment.

20 Claims, 6 Drawing Sheets

MANAGING VIRTUAL APPLICATION PERFORMANCE IN A VIRTUAL COMPUTING ENVIRONMENT

BACKGROUND

In network environments, a server can host or provide access to a plurality of resources or applications for a plurality of users.

SUMMARY

This technical solution is directed towards systems and methods of managing virtual application performance in a virtual computing environment. For example, a server can provide a virtual computing environment. A user of a client computing device can establish a session to the virtual computing environment. During the session, the server can execute a virtual application (or an instance of a virtual application). The user can access the virtual application via the virtual computing environment. However, due to various factors, the performance associated with the overall session may be poor. For example, the session itself may perform poorly due to issues with logging into or establishing the session, input/output round trip time of data communications in the session, connection failure, or session reconnects. Further, the application itself may perform poorly, such as due to a failure of the application to launch, application faults and crashes, application responsiveness, or application launch time. Due to the various factors associated with the session or virtual application, it can be challenging to determine what is the cause of the negative performance, as well as what action the system should take in order to remedy or mitigate the performance issues.

Thus, systems and methods of this technical solution an manage virtual application performance in a virtual computing environment by collecting application and session data associated with a session in a virtual computing environment. The technical solution can determine an application score based on application interaction factors, and combine the application score with a session score to determine an overall score. If the overall score does not satisfy a threshold, the technical solution can then determine whether the overall score did not satisfy the threshold due to the application score or the session score in order to select an action configured to improve the performance of the session or virtual application.

At least one aspect is directed to a method of managing virtual application performance in a virtual computing environment. The method can include one or more processors determining an application interaction score based on corresponding application interaction factors associated with sessions. The one or more processors can determine the application interaction score for each virtual application accessed during each of the sessions. The method can include the one or more processors generating an aggregated application interaction score for each of the sessions based at least on combining the application interaction score for each of the virtual applications accessed during a corresponding session. The method can include the one or more processors performing an action based at least in part on the aggregated application interaction score to improve performance of a virtual application accessed via the virtual computing environment.

The application interaction factors can include at least one of application launch failure, application faults and crashes, application responsiveness, or application launch time. The method can include the one or more processors combining, for each session, a session experience score with the aggregated application interaction score to generate a combined computing experience score for each session. The method can include the one or more processors determining an overall computing experience score based at least in part on aggregating the combined computing experience score for each of the sessions. The method can include the one or more processors performing the action based at least in part on the overall computing experience score. The session experience score can be determined based at least in part on a logon duration, input/output round trip time, connection failure, or session reconnects.

The method can include the one or more processors identifying a weight for each of the application interaction factors. The method can include the one or more processors applying the weight corresponding to each of the application interaction factors to generate weighted application factors. The method can include the one or more processors determining the application interaction score based on the weighted application factors.

The method can include the one or more processors identifying a session weight and an application weight. The method can include the one or more processors applying the session weight to a session experience score, and applying the application weight to the aggregated application interaction score. The method can include the one or more processors generating a combined computing experience score for each of the sessions based on the weighted session experience score and the weighted aggregated application interaction score.

The method can include the one or more processors combining, for each session of the sessions, a session experience score with the aggregated application interaction score to generate a combined computing experience score for each of the sessions. The method can include the one or more processors determining an overall computing experience score based at least in part on aggregating the combined computing experience score for each of the sessions. The method can include the one or more processors comparing the overall computing experience score with a threshold. The method can include the one or more processors selecting, responsive to the comparison of the overall computing experience score with the threshold, the action. The action can be selected from a set of actions that include at least one of changing a version of a virtual application of the plurality of virtual applications, patching the virtual application, or adjusting a scaling factor on one or more servers hosting the virtual application.

The method can include the one or more processors combining, for each of the sessions, a session experience score with the aggregated application interaction score to generate a combined computing experience score for each of the sessions. The method can include the one or more processors determining an overall computing experience score based at least in part on aggregating the combined computing experience score for each of the sessions. The method can include the one or more processors determining the overall computing experience score is greater than a first threshold. The method can include the one or more processors identifying, responsive to the overall computing experience score greater than the first threshold, a virtual application having the application interaction score greater than a second threshold. The method can include the one or more processors performing the action for the identified virtual application to improve a subsequent application interaction score generated based on a subsequent performance of the virtual application.

The method can include the one or more processors combining, for each of the sessions, a session experience score with the aggregated application interaction score to generate a combined computing experience score for each of the sessions. The method can include the one or more processors determining an overall computing experience score based at least in part on aggregating the combined computing experience score for each of the sessions. The method can include the one or more processors classifying a user experience as being negative based on the overall computing experience score, wherein the session experience score for each of the sessions indicates a positive user experience.

The method can include the one or more processors collecting process data at a time interval for processes in a session in the virtual computing environment. The method can include the one or more processors detecting an error in the process data. The method can include the one or more processors identifying, responsive to detection of the error, an application in an event viewer having an indication of the error. The method can include the one or more processors extracting a portion of the process data corresponding to the application with the error. The method can include the one or more processors generating at least a portion of the application interaction factors based at least in part on the portion of the process data corresponding to the application with the error.

At least one aspect is directed to a system to manage virtual application performance in a virtual computing environment. The system can include one or more processors and memory. The one or more processors can determine an application interaction score based on corresponding application interaction factors associated with sessions. The one or more processors can determine the application interaction score for each virtual application accessed during each of the sessions. The one or more processors can generate an aggregated application interaction score for each of the sessions based at least on combining the application interaction score for each of the virtual applications accessed during a corresponding session. The one or more processors can perform an action based at least in part on the aggregated application interaction score to improve performance of a virtual application accessed via the virtual computing environment.

The application interaction factors can include at least one of application launch failure, application faults and crashes, application responsiveness, or application launch time. The one or more processors can combine, for each session, a session experience score with the aggregated application interaction score to generate a combined computing experience score for each session. The one or more processors can determine an overall computing experience score based at least in part on aggregating the combined computing experience score for each of the sessions. The one or more processors can perform the action based at least in part on the overall computing experience score. The session experience score can be determined based at least in part on a logon duration, input/output round trip time, connection failure, or session reconnects.

The one or more processors can identify a weight for each of the application interaction factors. The one or more processors can apply the weight corresponding to each of the application interaction factors to generate weighted application factors. The one or more processors can determine the application interaction score based on the weighted application factors.

The one or more processors can identify a session weight and an application weight. The one or more processors can apply the session weight to a session experience score, and applying the application weight to the aggregated application interaction score. The one or more processors can generate a combined computing experience score for each of the sessions based on the weighted session experience score and the weighted aggregated application interaction score.

The one or more processors can combine, for each session of the sessions, a session experience score with the aggregated application interaction score to generate a combined computing experience score for each of the sessions. The one or more processors can determine an overall computing experience score based at least in part on aggregating the combined computing experience score for each of the sessions. The one or more processors can compare the overall computing experience score with a threshold. The one or more processors can select, responsive to the comparison of the overall computing experience score with the threshold, the action. The action can be selected from a set of actions that include at least one of changing a version of a virtual application of the plurality of virtual applications, patching the virtual application, or adjusting a scaling factor on one or more servers hosting the virtual application.

The one or more processors can combine, for each of the sessions, a session experience score with the aggregated application interaction score to generate a combined computing experience score for each of the sessions. The one or more processors can determine an overall computing experience score based at least in part on aggregating the combined computing experience score for each of the sessions. The one or more processors can determine the overall computing experience score is greater than a first threshold. The one or more processors can identify, responsive to the overall computing experience score greater than the first threshold, a virtual application having the application interaction score greater than a second threshold. The one or more processors can perform the action for the identified virtual application to improve a subsequent application interaction score generated based on a subsequent performance of the virtual application.

The one or more processors can combine, for each of the sessions, a session experience score with the aggregated application interaction score to generate a combined computing experience score for each of the sessions. The one or more processors can determine an overall computing experience score based at least in part on aggregating the combined computing experience score for each of the sessions. The one or more processors can classify a user experience as being negative based on the overall computing experience score, wherein the session experience score for each of the sessions indicates a positive user experience.

The one or more processors can collect process data at a time interval for processes in a session in the virtual computing environment. The one or more processors can detect an error in the process data. The one or more processors can identify, responsive to detection of the error, an application in an event viewer having an indication of the error. The one or more processors can extract a portion of the process data corresponding to the application with the error. The one or more processors can generate at least a portion of the application interaction factors based at least in part on the portion of the process data corresponding to the application with the error.

At least one aspect is directed to a non-transitory computer-readable medium storing processor executable instructions that, when executed by one or more processors, manage virtual application performance in a virtual computing environment. The instructions can include instructions to determine an application interaction score based on corresponding application interaction factors associated with sessions. The instructions can include instructions to determine the application interaction score for each virtual application accessed during each of the sessions. The instructions can include instructions to generate an aggregated application interaction score for each of the sessions based at least on combining the application interaction score for each of the virtual applications accessed during a corresponding session. The instructions can include instructions to perform an action based at least in part on the aggregated application interaction score to improve performance of a virtual application accessed via the virtual computing environment.

The instructions can include instructions to combine, for each session, a session experience score with the aggregated application interaction score to generate a combined computing experience score for each session. The instructions can include instructions to determine an overall computing experience score based at least in part on aggregating the combined computing experience score for each of the sessions. The instructions can include instructions to perform the action based at least in part on the overall computing experience score. The session experience score can be determined based at least in part on a logon duration, input/output round trip time, connection failure, or session reconnects.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
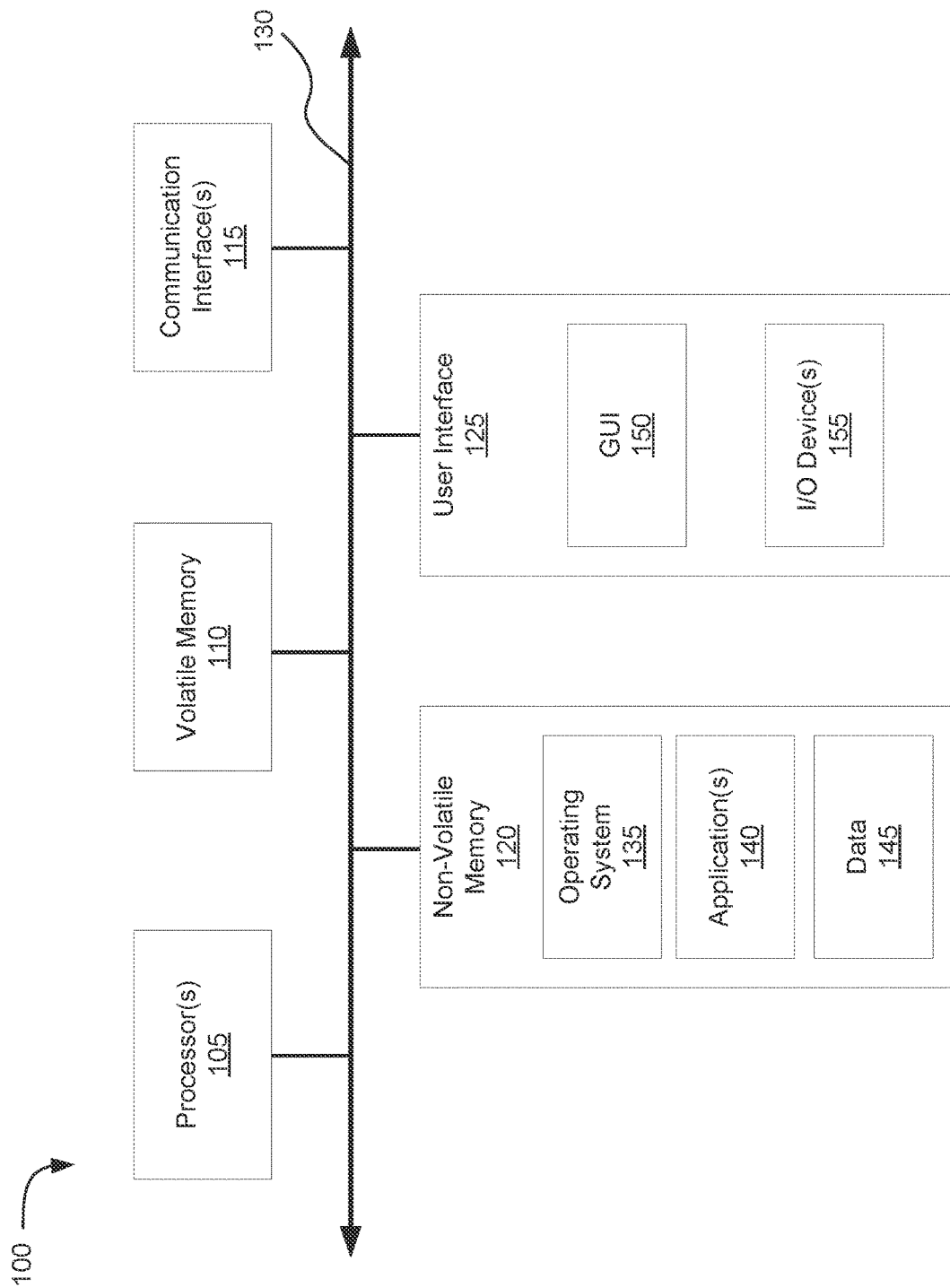
FIG. 1A is a block diagram of embodiments of a computing device.

Systems and methods of managing virtual application performance are provided. For example, performance metrics associated with the user experience in a session of a virtual computing environment can take into account factors impacting the session logon, such as logon duration, session responsiveness, or session resiliency. However, the experience of the user during a session of a virtual computing environment can be poor despite performance metrics that are based on session factors falling within a satisfactory range. For example, the user may have logged into the session smoothly and in a short amount of time, the session itself may be responsive, and the session may be resilient (e.g., no reconnects). Thus, this technical solution can take into account application interaction factors, such as the launch time of a virtual application (e.g., the launch of the application being slow or sluggish), the virtual application being unresponsive, or faults or errors when interacting with the application.

To do so, this technical solution can collect application interaction factors indicative of the user experience due to the virtual application. The technical solution can generate an application score based on the application factors, and combine the application score with a session score that is determined based on session factors. By bringing the application score into a common index with the session score, this technical solution can predict the overall user experience in the virtual computing environment. For example, when users indicate that the overall session experience is poor or the session is performing poorly, the system or administrator may be unable to determine an action, patch, update, remedy, or other solution configured to improve the overall session performance when the session score is excellent or satisfactory and the system does not have access to the application interaction factors or application score. Thus, this technical solution can provide increased granularity, resolution or insight into the performance of the session by generating an application score based on application interaction factors, and then combining the application score with the session score to generate an updated overall session experience score.

In an illustrative example, a user can launch a session with no reconnects or network issues, and a minimal logon duration. However, the application can crash when in use. This may result in an overall bad or negative user experience with the virtual session. However, it may be difficult or challenging to classify this experience as being in a negative or bad category based on the session factors. By including the application interaction factors, however, a system can better classify the experience as being negative or bad due to the application crashing. Thus, the technical solution can determine that the overall session experience was poor due to the configuration of the application, such as the application may be published or hosted on a stack that is outside a certain stack, or being published on resources that are faulty or buggy, thereby raising issues associated with the vendor of the application.

Application interaction factors can include, for example, application launch failure, application faults and crashes, application responsiveness, or application launch time. The application can fail to launch for various reasons, including, for example, a session failure, the maximum number of total instances allocated to the entity for the virtual application have been exceeded, the maximum number of instances allocated for the user have been exceeded, a launch timeout, or the maximum number of instances allocated to a single machine have been exceeded. An application fault or crash can refer to the application successfully launching, but then crashing while working with the application due to an external or internal failure. Application responsiveness can refer to the amount of time taken from actual input from the user to an event in the application occurring responsive to the input measured as part of the user input delay. Application launch time can refer to the amount of time it takes for the application to launch.

In order to determine the application score based on the application interaction factors, this technical solution can relate the fault or error with the application to a session key associated with a session. For example, the system can obtain a session ID associated with an operating system executing in the virtual computing environment. The system can relate a crashed virtual application with a session identifier associated with the virtual computing environment using a plugin part of the virtual computing environment. To do so, the system can collect all processes data from an operating system process based on a time interval (e.g., at intervals of 30 seconds for every five minute period), and then cache the process data. Whenever an application error or fault occurs, the system can read an event viewer to identify an indication of the error or fault, such as "application error" with an event identifier corresponding to an error or fault. The system can obtain process data based on comparing the collected process data with the application failure data. The system can then convert the session identifier of the operating system with the session identifier corresponding to the virtual computing environment session key, and append the session key to the application failure data.

The technical solution can include the application interaction as a factor in the overall user experience score. For example, the user experience score can include session factors such as logon duration, protocol round trip time, connection failures, or reconnects. The system can include the application interaction factor with a weight to the user experience score determination to provide a more holistic view of the user experience due to incidents that occur while interacting with application.

For example, the system can include a weight for each factor as follows: application launch failure weight 0.4, application faults and crashes weight 0.3, application responsiveness 0.2, and application launch time 0.1. The system can use the following Function 1 to determine an application interaction score based on these factors caused due to application interaction:

$$\text{AppScore} = \Sigma_{k=1}^{n}(W_k * f_k), \quad \text{[Function 1]}$$

where n is the number of factors; w is the weight of the factor; and f is the factor score value.

The system can integrate the application interaction score with the user experience by iterating over all application in a session launched by the user using the following Function 2:

$$\text{Session Experience} = \Sigma_{k=0}^{n}(W_k * \text{SessionExperience Score} + W2 * (\Sigma_{m=1}^{A} \text{AppScore})/A),$$

where n is the number of sessions, W1 is the weight of the session experience score, W2 is the weight of the application score, and A is the number of applications in the session. The weights W1 and W2 can have any value, such as a value between 0 and 1. The values for weights can be greater than 0. The values for weights can be greater than 1. W1 can be the same as W2, in which case no weight is applied relative to the scores. W1 can be weighted more heavily than W2, or W2 can be weighted more heavily than W1. For example, W1 can be 1 and W2 can be 0.5. In another example, W1 can be 0.5 and W2 can be 1. In another example, W1 can be 0.9, and W2 can be 1.

Thus, this technical solution can provide systems and methods that analyze a new category of reasons that may degrade user experience of virtual apps customers: faulty behavior of the applications themselves. The technical solution covers application limit misconfigurations by the admin and scenarios where the application takes too long to start, becomes unresponsive, or crashes. Further, this technical solution may not utilize further computing resources (e.g., processor or network utilization) on the machines hosting the virtual application. The technical solution can determine weighted scores across both session experience and application behavior.

For purposes of reading the description of the various embodiments below, the following descriptions of the sections of the specification and their respective contents can be helpful:

Section A describes a computing environment which can be useful for practicing embodiments described herein.

Section B describes systems and methods for managing virtual application performance in a virtual computing environment.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
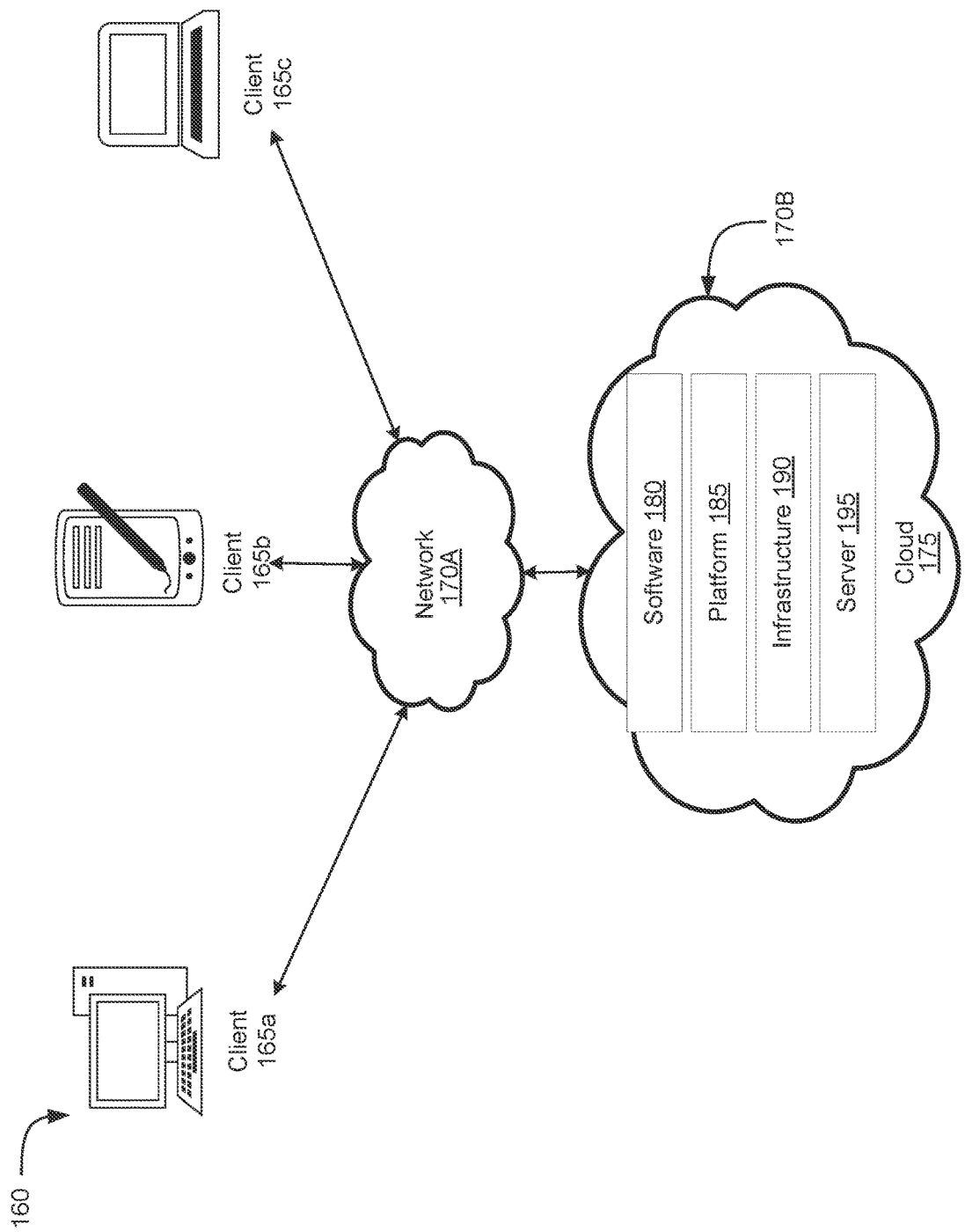
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Managing Virtual Application Performance

Systems and methods of managing virtual application performance are provided. For example, a server can provide a virtual computing environment. A user of a client computing device can establish a session to the virtual computing environment. During the session, the server can execute a virtual application (or an instance of a virtual application). The user can access the virtual application via the virtual computing environment. However, due to various factors, the performance associated with the overall session may be poor. For example, the session itself may perform poorly due to issues with logging into or establishing the session, input/output round trip time of data communications in the session, connection failure, or session reconnects. Further, the application itself may perform poorly, such as due to a failure of the application to launch, application faults and crashes, application responsiveness, or application launch time. Due to the various factors associated with the session or virtual application, it can be challenging to determine what is the cause of the negative performance, as well as what action the system should take in order to remedy or mitigate the performance issues.

Thus, systems and methods of this technical solution an manage virtual application performance in a virtual computing environment by collecting application and session data associated with a session in a virtual computing environment. The technical solution can determine an application score based on application interaction factors, and combine the application score with a session score to determine an overall score. If the overall score does not satisfy a threshold, the technical solution can then determine whether the overall score did not satisfy the threshold due to the application score or the session score in order to select an action configured to improve the performance of the session or virtual application.

Figure 2:
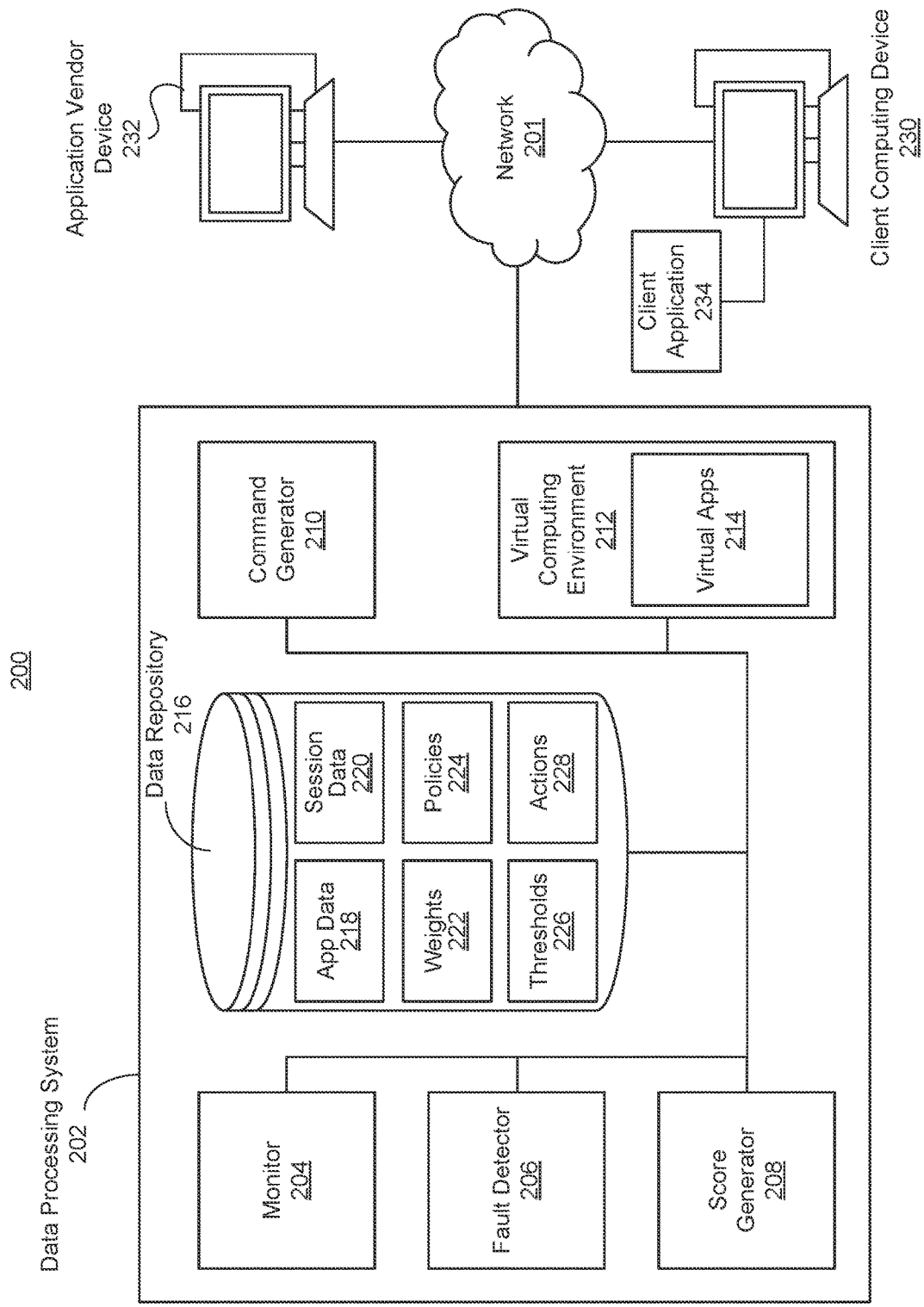
FIG. 2 is a block diagram of a system for managing virtual application performance in a virtual computing environment, in accordance with an implementation.

Referring to FIG. 2, depicted is a block diagram of a system for managing virtual application performance in a virtual computing environment, in accordance with an implementation. The system 200 can include a data processing system 202 that can interface or communication with a client computing device 230 via a network 201. The data processing system 202 can include one or more servers, such as servers 195, or be part of the cloud 175. The data processing system 202 can interface or communicate with an application vender device 232 via network 201. The application vender device 232 can include one or more servers 195, be part of the cloud 175, or include a component or functionality of client 165a-c. The client computing device 230 can include one or more component or functionality of client device 165a-c depicted in FIG. 1B. The application vendor 232 can include or refer to a vendor, provider, or administrator of a virtual application that is hosted or executed in a virtual computing environment. The application vender device 232 can host the virtual application, or provide the virtual application to the data processing system 202 or other server or cloud (e.g., cloud 175) for hosting. The data processing system 202 can include a monitor 204 that can collect application or session data. The data processing system 202 can include a fault detector 206 that can detect error, crashes, or faults associated with a virtual application. The data processing system 202 can include a score generator 208 that can determine an application score or session score based on the data collected by the monitor 204. The data processing system 202 can include a command generator 210 that can generate a command or action to improve user experience in a virtual computing environment by fixing an issue in the virtual application that resulted in the crash, fault or error. The data processing system 202 can provide a virtual computing environment 212 that hosts one or more virtual applications 214.

The monitor 204, fault detector 206, score generator 208, command generator 210, or virtual computing environment 212 can each include at least one processing unit or other logic device such as programmable logic array engine, or module configured to communicate with one or more other system or component depicted in FIG. 1. The monitor 204, fault detector 206, score generator 208, command generator 210, or virtual computing environment 212 can be separate components, a single component, or part of the server 430. In some cases, a portion of the virtual computing environment 212 or virtual application 214 can be part of or provided by the application vendor 232. In some cases, a portion of the monitor 204 or fault detector can be part of provided by the client computing device 230. The system 100 and its components can include hardware elements, such as one or more processors, logic devices, or circuits.

The data processing system 202, client computing device 230 or application vendor device 232 can include or be implemented using hardware or a combination of software and hardware. For example, components of the data processing system 202, client computing device 230 or application vendor device 232 can include logical circuity (e.g., a central processing unit or CPU) that responses to and processes instructions fetched from a memory unit. Components of the data processing system 202, client computing device 230 or application vendor device 232 can include or use a microprocessor or a multi-core processor. A multi-core processor can include two or more processing units on a single computing component. Components of the data processing system 202, client computing device 230 or application vendor device 232 can be based on any of these processors, or any other processor capable of operating as described herein. Processors can utilize instruction level parallelism, thread level parallelism, different levels of cache, etc. For example, the data processing system 202, client computing device 230 or application vendor device 232 can include at least one logic device such as a computing device or server having at least one processor 105. The components and elements of the data processing system 202, client computing device 230 or application vendor device 232 can be separate components or a single component. The data processing system 202, client computing device 230 or application vendor device 232 can include a memory component, a random access memory (RAM) or other dynamic storage device, a storage device for storing information, and instructions to be executed. The memory can include at least one read only memory (ROM) or other static storage device coupled with the storage device for storing static information and instructions. The memory can include a storage device, such as a solid state device, magnetic disk or optical disk, to persistently store information and instructions.

Still referring to FIG. 2, and in further detail, the system 200 can include, access, communicate with, or otherwise interface with a client computing device 230 that executes or provides a client application 234. The client computing device 230, via client application 234, can establish a session with or in a virtual computing environment 212. The session can refer to a session to access web or SaaS delivered application from the data processing system 202, application vendor device 232, or web servers. The client computing device 230 can include one or more client applications 234, such as a web browser or agent, configured to establish a session with the virtual computing environment 212 to access one or more virtual applications 214.

The client application 234 can include one or more components, such as an embedded browser, a networking agent, a cloud services agent (e.g., a management agent), a remote session agent (e.g., a High-Definition User Experience "HDX" engine), and/or a secure container, e.g., a secure cache container). One or more of the components can be installed as part of a software build or release of the client application 234, or separately acquired or downloaded and installed/integrated into an existing installation of the client application 234 for instance. The client computing device 230 can download or otherwise receive the client application 234 (or any component) from the data processing system 202. In some implementations, the client computing device 230 can send a request for the client application 234 to the data processing system 202. For example, a user of the client computing device 230 can initiate a request, download and/or installation of the client application 234. The data processing system 202 in turn can send the client application 234 to the client computing device 230. In some implementations, the data processing system 202 can send a setup or installation application for the client application 234 to the client computing device 230. Upon receipt, the client computing device 230 can install the client application 234 onto a hard disk of the client computing device 230. The client computing device 230 can run the setup application to unpack or decompress a package of the client application 234. The client application 234 can be an extension (e.g., an add-on, an add-in, an applet or a plug-in) to another application (e.g., a cloud services agent) installed on the client computing device 230. The client computing device 230 can install the client application 234 to interface or inter-operate with the pre-installed application. In some cases, the client application 234 can be a standalone application. The client computing device 230 can install the client application 234 to execute as a separate process.

The client application 234 can include elements and functionalities of a web browser application or engine. The client application 234 can locally render virtual applications 214 as a component or extension of the client application 234. For instance, the client application 234 can render a SaaS/Web application inside the client application 234 which can provide the client application 234 with full visibility and control of the application session. The embedded browser can be embedded or incorporated into the client application 234 via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JavaScript support to a client application incorporating various programming languages. For example, elements of the embedded browser can bind to a client application incorporating C, C++, Delphi, Go, Java, .NET/Mono, Visual Basic 6.0, and/or Python.

In some implementations, the client application 234 (e.g., embedded browser comprises) a plug-in installed on the client application 234. For example, the plug-in can include one or more components. One such component can be an ActiveX control or Java control or any other type and/or form of executable instructions capable of loading into and executing in the client application. For example, the client application 234 can load and run an Active X control of the embedded browser, such as in a memory space or context of the client application. In some implementations, the embedded browser can be installed as an extension on the client application 234, and a user can choose to enable or disable the plugin or extension. The embedded browser (e.g., via the plugin or extension) can form or operate as a secured browser for securing, using and/or accessing resources within the secured portion of the digital workspace.

The embedded browser can incorporate code and functionalities beyond that available or possible in a standard or typical browser. For instance, the embedded browser can bind with or be assigned with a secured container, to define at least part of the secured portion of a user's digital workspace. The embedded browser can bind with or be assigned with a portion of the client computing device's 230 cache to form a secured clipboard (e.g., local to the client computing device 230, or extendable to other devices), that can be at least part of the secured container. The embedded browser can be integrated with the client application 234 to ensure that traffic related to network applications is routed through and/or processed in the client application, which can provide the client application with real-time visibility to the traffic (e.g., when decrypted through the client application). This visibility to the traffic can allow the client application 234 to perform or facilitate policy-based management (e.g., including data loss prevention (DLP) capabilities), application control, and collection and production of analytics.

In some embodiments, the client application 234 can interoperate with the data processing system 202 to access the virtual application 214. For example, the client application 234 can receive and transmit navigation commands from a user to a virtual application 214 hosted in the virtual computing environment 212 provided via the data processing system 202. The client application 234 can use a remote presentation protocol to display the output generated by the virtual application 214. For example, the client application 234 can include a HTML5 web client that allows end users to access remote virtual applications 214 or virtual computing environments 212 via the client application 234.

The client application 234 operate on the application layer of the operational (OSI) stack of the client computing device 230. The client application 234 can include and/or execute one or more agents that interoperate with the data processing system 202. The client application 234 can receive, obtain, retrieve or otherwise access various policies (e.g., an enterprise's custom, specified or internal policies or rules) and/or data (e.g., from the data processing system 202, application vendor device 232, or another server, that can be managed by the enterprise). The client application 234 can access the policies and/or data to control and/or manage a network application (e.g., a SaaS, web or remote-hosted application). Control and/or management of a network application can include control and/or management of various aspects of the virtual application 214, such as access control, session delivery, available features or functions, service level, traffic management and monitoring, and so on. The virtual application 214 can be from an application vendor device 232, such as a provider or vendor of the enterprise (e.g., salesforce.com, SAP, Microsoft Office 365), from the enterprise itself, or from another entity (e.g., Dropbox or Gmail service).

The client application 234 can establish a session with the virtual computing environment 212 or to a virtual application 214. The session can support a remoting protocol (e.g., HDX or ICA). The session can include a remote desktop session and/or remote application session using any variety of protocols, such as the Remote Desktop Protocol (RDP), Appliance Link Protocol (ALP), Remote Frame Buffer (RFB) Protocol, and ICA Protocol. The session can be for a user of the client computing device 230 to access a virtual application 214. The client application 234 can establish the session within or over a secure connection (e.g., a VPN).

The data processing system 202 or other server can provide or host the virtual computing environment 212 (e.g., a virtual desktop) or virtual applications 214. By way of a non-limiting example, virtual applications 214 can include network applications from Workday, Salesforce, Office 365, SAP, etc. Example virtual applications can include word processing applications, presentation applications, messaging applications, software development applications, spreadsheet applications, etc. A user instance of a client application 234, that is installed on client computing device 230, can register or authenticate with the data processing system 202 or virtual computing environment 212. For example, the user can authenticate the user to the client computing device 230 and login to the client computing device 230. The client application 234 can automatically execute, or be activated by the user. In some embodiments, the user can sign in to the client application 234 (e.g., by authenticating the user to the client application 234). In response to the login or sign-in, the client application can register or authenticate the user and/or the client application with the virtual computing environment 212.

In response to the registration or authentication of the user, the virtual computing environment 212 can identify or retrieve a list of enumerated virtual applications 214 available or pre-assigned to the user, and can provide the list to the client application 234. For example, in response to the registration or authentication, the virtual computing environment 212 can identify the user and/or retrieve a user profile of the user. According to the identity and/or user profile, the virtual computing environment 212 can determine the list (e.g., retrieve a stored list of virtual applications 214 matched with the user profile and/or the identity of the user). The list can correspond to virtual applications 214 sanctioned for the user. The virtual computing environment 212 can send the list to the client application 234, which can be presented via the client application 234 to the user (e.g., in a storefront user interface) for selection.

The user can initiate connection to a virtual application 214 (e.g., a SaaS application), by selecting from the list of network applications presented to the user. For example, the user can click on an icon or other representation of the virtual application 214, displayed via the client application 234. This user action can trigger the client application 234 to transmit a connection or access request to a server that provisions the virtual application 214. The request can include a request to the data processing system 202, the application vendor device 232 server, or other SaaS provider to authenticate the user and establish a session.

The data processing system 202 can include a provide a single sign-on operation to authenticate the user. For example, in response to a request to authenticate the user, the client application 234 or data processing system 202 can provide credentials of the user for SSO, to access the selected virtual application 214. The user can establish a session to the virtual application by logging into the virtual application 214, based on the SSO (e.g., using the credentials). The client application 234 can establish a secure connection and session with the data processing system 202 to access the selected virtual application 214. The client application 234 can decrypt application traffic received via the secure connection. The client application 234 can monitor traffic sent via the client application 234 and the secured connection to the data processing system 202.

The client application 234 can provide information to the data processing system 202 for analytics processing. For example, the client application 234 can monitor for or capture user interaction events with the selected virtual application 214. The client application 234 can convey the user interaction events to the data processing system 202, to be processed to produce analytics.

The system 200 can include a data processing system 202. The data processing system 202 can include a monitor 204 designed, constructed and operational to collect application data or session data. For example, a client computing device 230 can establish a session with or in a virtual computing environment 212. The session can refer to a session to access web or SaaS delivered application from the data processing system 202, application vendor device 232, or web servers. The client computing device 230 can include one or more client applications 234, such as a web browser or agent, configured to establish a session with the virtual computing environment 212 to access one or more virtual applications 214.

The monitor 204 can collect processes data from the virtual computing environment 212. The monitor 204 can collect processes data from the operating system executing in the virtual computing environment 212 during the session. The monitor 204 can collect data using a program, system or function of the virtual computing environment 212 or operating system executing therein. For example, the monitor 204 can collect processes data from a Windows Management Instrumentation ("WMI") provided for the Windows Operating system provided by Microsoft Corporation of Redmond, Washington. The monitor 204 can collected processes data using a web-based enterprise management or common information model standards.

WMI can include a set of extension to a driver model that provides an operating system interface through which components of the operating system or virtual computing environment 212 can provide information and notification. The monitor 204, using scripts, programs, or other tools (e.g., VBscript or Windows Powershell) can manage the virtual computing environment 212 during the session. WMI can define a proprietary set of environment-independent specifications which allow management information to be shared between management applications, such as the monitor 204.

Thus, using WMI, the monitor 204 can request information about the state of the session of the virtual computing environment 212 with the client computing device 230. The monitor 204 can use WMI to obtain data associated with the session. For example, the monitor 204 can request information about a state of a particular application, such as a virtual application 214. The monitor 204, via WMI, can view entries from an event log of the operating system of the virtual computing environment 212. The monitor 204, via WMI, can request data from a virtual application 214 configured to interface with the monitor 204 via WMI.

In some cases, by using the WMI interface, the monitor 204 may not use excess processor or memory utilization. For example, the WMI may be built-in or integrated with the operating system of the virtual computing environment 212. Thus, the monitor 204, by interfacing with the WMI to collect processes data, session data, or application data, for example, can avoid using excessive or extra processor resources of the data processing system 202.

The monitor 204 can obtain information from the event viewer via the WMI. The event can provide information about error events, for example. The Event Viewer can refer to an application that is installed, integrated with or otherwise provided with the operating system of the virtual computing environment 212. The event viewer can include event logs for various applications, agents, or other resources executing in the virtual computing environment 212 in the session. The monitor 204 can collect data from the event viewer for further processing.

For example, the monitor 204 can collect some or all processes data from the WMI based on a time interval (e.g., every 10 seconds, 20 seconds, 30 seconds, 45 seconds, 60 seconds, 2 minutes, 3 minutes, 5 minutes or other time interval). The monitor 204 can collect all process data from the WMI at an interval of 30 seconds for every five minute period, for example. The monitor 204 can cache or store the data in the data repository 216, such as in the application data 218 data structure.

The process data or application data 218 data structure can have the following example structure:

```
public class ProcessData
{
    public long ProcessId {get; set}
    public long Session Id {get; set}
}
```

The data processing system 202 can include a fault detector 206 designed, constructed and operational to detect, determine, or otherwise identify errors, faults or other issues associated with a virtual application 214 in the session in the virtual computing environment 212. The fault detector 206 can detect error, faults or crashes in virtual applications 214 that are launched in the virtual computing environment 212. For example, the fault detector 206 can identify prompts such as error prompts responsive to a virtual application 214 crashing. In some cases, the fault detector 206 can access the Event Viewer of the operating system to identify errors or other issues associated with the virtual application 214.

For example, the fault detector 206 can parse, read, or otherwise process the application data 218 collected by the monitor 204 and stored in application data 218 data structure. When a virtual application has an error or fault, the fault detector 206 can read the Event Viewer under the source name "Application Error" with Event ID 1000 or Win32_NTLogEvent for TargetInstance.Logfile='Application' and TargetInstance.SourceName='Application Error'.

The fault detector 206 can obtain the process data or application data 218 based on the processID. For example, the fault detector 206 can compare the processId in the application data 218 with the processId in the application failure data obtain from the event viewer. Responsive to matching the processId, the fault detector 206 can access the corresponding process data collected by monitor 204 and stored in application data 218.

In some cases, different scripts, programs or tools can use different identifiers. The operating system may utilize a first identifier, whereas the virtual computing environment 212 or agent or broker thereof may use a second identifier that is different than the first identifier. For example, the operating system can utilize a session identifier ("sessionId") that can be established for the session between the client computing device 230 and the virtual computing environment 212. The sessionId can correspond to the process data stored as application data 218. For example, the application data 218 can include the sessionId. The virtual computing environment 212 can use a different identifier, such as a session key. The data processing system 202 can convert the sessionId to a session key and append the session key to the application data 218 for storage or further processing.

The data processing system 202 (e.g., via monitor 204 or fault detector 206) can convert the windows sessionId to the session key. The data processing system 202 can obtain the sessionId from a virtual delivery agent ("VDA"), for example, that can run in the virtual computing environment 212. The data processing system 202 can obtain the session by server, username, application name, or session status. The data processing system 202 can log any action performed in a session, such as logoff, disconnect, killing process, or shadowing.

In some cases, the virtual computing environment 212 can include a plug-in. The plug-in can communicate or interface with the monitor 204 and fault detector 206. The plug-in can include one or more component or functionality of the monitor 204 or fault detector 206. The plug-in can collect process data at a time interval for processes in a session of the plurality of sessions in the virtual computing environment. The plug-in can detect, in the process data, an error in the process data. The plug-in can access an event viewer in the virtual computing environment 212 in order to identify the error. For example, the plug-in can identify an application in an event viewer having an indication of the error. The plug-in can extract a portion of the process data corresponding to the application with the error. The plug-in can provide this information to the monitor 204 for storage in the data repository 216, such as in the application data 218 data structure and/or the session data 220 data structure. The data processing system 202 can generate at least a portion of the plurality of application interaction factors based at least in part on the portion of the process data corresponding to the application with the error.

The data processing system 202 can include a score generator 208 designed, constructed and operational to determine an application interactions core. The score generator 208 can determine the application interaction score based at least in part on application interaction factors. The score generator 208 can determine an application interaction score for one or more virtual applications 214 that execute in the virtual computing environment 212. The score generator 208 can determine an application interaction score for each virtual application 214 that executes in the virtual computing environment 212.

In some cases, the score generator 208 can determine the application interaction score for a predetermined set of virtual application 214. For example, the score generator 208 can be configured with a list of virtual application 214 for which to generate an application interaction score. The list of applications can be provided by an administrator of the entity providing the data processing system 202 or virtual computing environment 212. The list of virtual applications 214 for which to determine the application interaction score can be provided by a user of the client computing device 230. In some cases, an application vendor device 232 or vendor of the virtual application 214 can indicate whether the score generator 208 is to determine an application interaction score for the virtual application 214 provided by the vendor. For example, the vendor device 232 or vendor can enable or disable score generation for the virtual application 214 provided by vendor.

In some cases, the score generator 208 can use a model to determine whether or not to generate an application interaction score for a particular application. For example, the score generator 208 can determine, using the model, whether to generate an application interaction score for a virtual application 214 based on historical information associated with the virtual application 214 or vendor of the virtual application 214. For example, if the virtual application 214 is a new application or a recently updated application, the data processing system 202 can determine to generate the application interaction score in order to determine whether it may be a cause of errors, faults or other issues that can result in poor user experience. The data processing system 202 can determine to generate an application interaction score for virtual application 214 that are likely to be a cause of poor or negative user experience by way of errors, faults or other issues. The data processing system 202, on the other hand, can determine not to generate an application interaction score for virtual application 214 that have been vetted or validated based on historical application interaction scores that satisfy a threshold. For example, if application interaction scores for a particular virtual application 214 have consistently satisfied a threshold for a certain time interval (e.g., last 30 days, 60 days, 90 days), then the data processing system 202 can determine that it may not be worthwhile to determine the application interaction score for this virtual application 214. Thus, the data processing system 202 can determine to reduce processor or memory utilization by determining not to compute the application interaction score for the virtual application 214. However, if the virtual application 214 is new or recently updated, or has an application interaction score that does not consistently satisfy a threshold, then the score generator 208 can determine the application interaction score in order to determine a cause of the negative user experience.

In some cases, the data processing system 202 can determine the application interaction score for each virtual application 214 accessed during each session of the virtual computing environment 212. The score generator 208 can determine the application interaction score based on application interaction factors. The score generator 208 can obtain the application interaction factors from the application data 218 collected by the monitor 204 and stored in the data repository 216. The application interaction factors can include at least one of application launch failure, application faults and crashes, application responsiveness, or application launch time, for example.

The application launch failure can refer to a situation in which the session is successfully established between the client computing device 230 and the virtual computing environment 212, but the application fails to launch. For example, the session broker can successfully broker or establish the session between the client computing device 230 and the virtual computing environment 212. A successful session can refer to establishing the virtual desktop or providing virtual desktop access to the virtual computing environment 212. In cases, even though the session is established successfully, the virtual application can fail to launch for various reasons.

For example, the virtual application 214 can fail to launch due to a maximum total number of instances allocated for the virtual application 214 being exceeded. The maximum total number of instances can be set by an administrator of the data processing system 202, client computing device 230, or application vendor device 232. For example, an entity, such as an organization or company, can purchase a certain number of instances or licenses of the virtual application 214 to be used by employees or client computing devices 230 associated with the entity. In some cases, the maximum number of instances of the virtual application 214 can be based on available computing resources, such as processor or memory availability. For example, the data processing system 202 or application vendor device 232 may have a capacity limit for the number of simultaneous instances of the virtual application 214 that can be executing at a given time.

The virtual application 214 can fail to launch due to exceeding the maximum per user instances. This limit can refer to the number of instances of the virtual application 214 are allocated to a particular client computing device 230 or user account associated with the client computing device 230. The same user may have multiple instances of the virtual application 214 executing on the same client computing device 230, or on multiple client computing device 230. The user may log into an instance of the virtual computing environment 212 on a first client computing device 230, while logging into a second instance of the virtual computing environment 212 on a second device. The user may try to launch the same virtual application 214 in each virtual computing environment, but the application may fail to launch in one of the virtual computing environments 212 due to the max per user limit. In another example, the user may have multiple instances of the same virtual application 214 executing in the same virtual computing environment 212. However, launching an additional instance of the same virtual application 214 may exceeding the max per user instances limit, thereby resulting in failure to launch the additional instance of the virtual application 214.

The virtual application 214 can fail to launch due to a session failure. The session fail subsequent to the successful brokering and establishment of the session. However, upon launching of the virtual application 214, the session can fail, thereby precluding the virtual application 214 from successfully launching.

The launch of the virtual application 214 can timeout, thereby resulting in failure of the virtual application 214 to launch. For example, the virtual application 214, data processing system 202, or virtual computing environment 212 can be configured with a launch timeout value. The launch timeout value can indicate an amount of time allotted to launch an application. If the virtual application 214 does not successfully launch within the launch timeout period, the virtual computing environment 212 can terminate the attempt to launch of the virtual application 214. The launch timeout can be exceeded for various reasons. The launch timeout value can be 5 seconds, 6 seconds, 8 seconds, 10 seconds, 15 seconds, 20 seconds, 30 seconds or some other time period. The launch timeout value can be a fixed value or a dynamic value. The launch timeout can be fixed for a particular type of virtual application 214, application vendor device 232, or client computing device 230. The launch timeout value can be dynamic and vary based on a type of network 201, client computing device 230, or other factors.

The application interaction factors can include application faults and crashes. Application faults and crashes can refer to or include situations in which the virtual application 214 can successfully launch, but later crashes while the user is working with the virtual application 214. The cause of the crash can be an external or internal reason. For example, the virtual application 214 can crash due to an error condition in the virtual application 214, or issue with a second virtual application 214 that may not be compatible with the virtual application 214, due to user error in the virtual application 214, due to loss of network connection, or other issues.

The application interaction factors can include application responsiveness. Application responsiveness can refer to, include, or be based on the amount of time taken from the actual input from the user to occurrence of the event corresponding to that input. The data processing system 202, virtual computing environment 212, or agent on the client computing device 230 can measure the amount of the time that has elapsed between the user input on the client computing device 230 and the occurrence of the corresponding event in the virtual computing environment 212 or in the virtual application 214.

The application interaction factor can include an application launch time. The application launch time can refer to the amount of time it takes for the application to launch. While the launch of the application may be successful, the amount of time taken to launch the application may be indicative of positive or negative user experience, as well as performance issues associated with the virtual computing environment 212. The amount of time can be measured from when the user input is received by the virtual computing environment 212 or data processing system 202, to when the virtual application 214 has launched and loaded in the virtual computing environment 212 and is in an online, active, or ready state.

The score generator 208 can generate an application interaction score using one or more weights. For example, the score generator 208 can access weights 222 data structure stored in the data repository 216 to determine one or more weights to apply to the application interaction factors in order to determine the application interaction score. Table 1 depicts an illustrative example of the weights 222 data structure including weights for application interaction factors.

TABLE 1

Weights for Application Interaction Factors

| Application Interaction Factors | Weight |
|---|---|
| Application Launch Failure | 0.4 |
| Application Faults and Crashes | 0.3 |
| Application Responsiveness | 0.2 |
| Application Launch Time | 0.1 |

As depicted in Table 1, the score generator 208 can apply various weights to the various application interaction factors. For example, the score generator 208 can apply a weight of 0.4 to the application launch failure factor; a weight of 0.3 to the application faults and crashes factors; a weight of 0.2 to the application responsiveness factor; and a weight of 0.1 to the application launch time factor. In this example, the application launch failure factor is weighted more heavily than the other factors, and the application launch time factor has the lowest weight. The higher the weight the more impact the factor can have on the application interaction score, whereas the lower the weight the less impact the factor can have on the application interaction score. Thus, by weighting certain factors more heavily, the score generator 208 can generate an application interaction score that more accurately reflects the performance of the virtual application 214 and corresponding user experience with regard to the virtual application 214.

The score generator 208 can generate the application interaction score with weights using the following Function 1:

$$AppScore = \Sigma k = 1^n (W_k * f_k), \quad \text{[Function 1]}$$

where n is the number of factors; $W_k$ is the weight of the kth factor; and f is the factor score value. The factor score value can be a numerical value that corresponds to the measured factor. The factor score can be, for example, an integer value, measurement of the factor, a count of occurrences of the factor, a time, other value. The factor score can be determined based on measurements associated with the factor. The factor score can map to or correspond to a measurement associated with the factor. The factor score can be a number of occurrences of a failure associated with the factor, such as a number of times there was an application launch failure, the number of times there was a fault or crash in the application, the number of times the application responsiveness failed a threshold responsiveness time, or the number of times the application launch time failed a threshold launch time (e.g., where the threshold launch time is less than the launch timeout such that the application does launch). The factor scores for various factors can be normalized or converted into a type of score such that the factor scores can be combined, as in Function 1.

Thus, the score generator 208 can determine the application interaction factor with or without applying weights to the various application factor scores. The score generator 208 can identify a weight for each of the plurality of application interaction factors from the weights 222 data structure. The score generator 208 can apply the weight corresponding to each of the plurality of application interaction factors to generate a plurality of weighted application factors. The score generator 208 can determine the application interaction score based on the plurality of weighted application factors.

The score generator 208 can generate the application interaction score for each virtual application 214 such that each virtual application 214 has its own application interaction score. The score generator 208 can generate the application interaction score for each session such that each session has an application score specific to a particular virtual application 214. The score generator 208 can aggregate the application interaction score across all sessions containing the same virtual application 214. The score generator 208 can aggregated the application interaction score across multiple virtual application 214 in a same session. The score generator 208 can aggregate the application interaction score across multiple virtual application 214 and across multiple session.

For example, the score generator 208 can generate, for each session, an aggregated application interaction score based at least on combining the application interaction score for each of the virtual applications accessed during a corresponding session. The aggregated application interaction score can take into account application interaction scores generated for multiple virtual applications 214 launched or attempted to be launched in a session. By doing so, the score generator 208 can generate an aggregated application interaction score for each session using the following Function 3:

$$\text{AggregatedAppScore} = \Sigma_{m=1}^{A} \text{AppScore}/A, \quad \text{[Function 3]}$$

where AppScore is determined from Function 1, and A is the number of application in the session. The AggregatedAppScore can represent an average application score for virtual applications launched or attempted to be launched in the session. The score generator 208 can use any technique to combine the application scores. For example, the score generator 208 can multiple the application interaction scores, sum the application interaction scores, or take a weighted average of the application interaction scores. For example, the score generator 208 can weight applications scores and then sum or average the application scores. The score generator can add weights corresponding to a level of importance of the application on performance or user experience. For example, an application that is heavily used by the user may be weighted more heavily, whereas an application that is rarely used or minimally used may be weighted less heavily, for example. For example, an email program, word processing program or software development tool may be weighted more heavily as compared to a rarely used application such as a paint.

The score generator 208 can combine the application interaction score with a session experience score. The score generator 208 can combine the aggregated application interaction score with the session experience score. The score generator 208 can use any technique to combine the application score or aggregated application interaction score with the session experience score, including, for example, summing the scores, multiplying the scores, or averaging the scores. The score generator 208 can apply a weight to the session experience score and the aggregated application interaction score before combining the scores. For example, the score generator can apply a heavier weight to the session experience score as compared to the weight applied to the application interaction score such that the session experience score has a larger impact on the overall experience score. The score generator 208 can apply a heavier weight to the aggregated application interaction score as compared to the session experience score such that the aggregated application interaction score has a heaver impact on the overall experience score.

The score generator 208 can generate an overall score for a single session and single application by integrating a single session experience score with a single application interaction score. The score generator 208 can generate an overall score for a single session by integrating a single session experience with an average application score based on multiple scores corresponding to multiple applications run in the session. The score generator 208 can generate an overall score for multiple sessions by integrating the multiple session scores with an application score for a single virtual application executed in the multiple session. The score generator can generate an overall score by integrating multiple session experience scores for multiple session with multiple application interaction scores for multiple applications.

In some cases, the score generator 208 can identify a session weight and an application weight. The score generator 208 access the weights 222 data structure stored in the data repository 216 to identify or retrieve the session weight and the application weight. The score generator 208 can apply the session weight to a session experience score, and apply the application weight to the aggregated application interaction score. The score generator 208 can generate a combined computing experience score for each session of the plurality of sessions based on the weighted session experience score and the weighted aggregated application interaction score.

For example, the score generator can generate a combined computing experience score for each session by combining the session experience score with the aggregated application interaction score as follows in Function 4:

$$\text{CombinedComputingExperience} \\ \text{Score} = W1 * \text{SessionExperienceScore} + W2 * \\ (\Sigma_{m=1}^{A}\text{AppScore})/A, \quad \text{[Function 4]}$$

where W1 is the weight of the session experience score, W2 is the weight of the application score, and A is the number of applications in the session.

The score generator 208 can determine an overall computing experience score based at least in part on aggregating the combined computing experience score for each session of the plurality of sessions. For example, the score generator 208 can combine or integrate the aggregated application interaction score with the user experience by iterating over all application in a session launched by the user using the following Function 2:

$$OveralComputingExperienceScore = \sum_{k=0}^{n} (W1 * SessionExperienceScore + W2 * (\sum_{m=1} AppScore)/A),$$ [Function 2].

where n is the number of sessions, W1 is the weight of the session experience score, W2 is the weight of the application score, and A is the number of applications in the session.

Thus, the score generator 208 can combine, for each session of the plurality of sessions, a session experience score with the aggregated application interaction score to generate a combined computing experience score for each session of the plurality of sessions. The score generator 208 can determine an overall computing experience score based at least in part on aggregating the combined computing experience score for each session of the plurality of sessions.

The score generator 208 can determine, obtain, receive, retrieve or otherwise identify the session experience score. The session experience score can be based on factors such as a logon duration, input/output round trip time, connection failure, or session reconnects. The logon duration, input/output round trip time, connection failure, or session reconnects can be determined by the monitor 204 or other agent or broker associated with the data processing system 202 or client computing device 230, or virtual computing environment 212. The logon duration, input/output round trip time, connection failure, or session reconnects can be stored in session data 220 in data repository 216, and obtained by the score generator 208 to determine the session experience score. In some cases, the session experience score can be stored in session data 220.

The logon duration can refer to the amount of time a session is active and online before a disconnect. The input/output round trip time can refer to the amount of time between the client computing device 230 receiving an input and the client computing device 230 providing an output via the virtual computing environment 212 corresponding to the input. The input/output round trip time can occur over a protocol, such as an independent computing architecture protocol or other protocol configured for use with an application server system or data processing system 202.

The connection failure can refer to when a session established between the client computing device 230 and the virtual computing environment 212 disconnects, terminates or otherwise ends without the client computing device 230 or data processing system 202 intending to end the session. The session reconnects can refer to the client computing device 230 or data processing system 202 attempting to reconnect or reestablish the session after a connection failure. Session reconnects can be automatically initiated responsive to an inadvertent connection failure, or initiated by a user of the client computing device 230 responsive to a connection failure. The reconnects can occur via a common gateway protocol, or be an automatic client reconnect.

The data processing system 202 can include a command generator 210 designed, constructed and operational to generate a command, instruction or action based at least in part on a score generated by the score generator 208. The command generator 210 can perform an action based at least in part on the aggregated application interaction score to improve performance of a virtual application 214 accessed via the virtual computing environment 212. The command generator 210 can determine what action to perform to improve the performance base on overall computing experience score as determined via Function 2, for example. Example actions or commands can include updating the virtual application 214 to a new version, reverting or rolling back the virtual application 214 to an old or previous version, increase access to memory or processor capacity to scale up the data processing system 202 or cloud computing environment, apply a patch to the virtual computing environment 212 or virtual application 214, or perform other action to improve the performance. For example, the actions 228 data structure can include actions to change a version of a virtual application of the plurality of virtual applications, patch the virtual application, or adjust a scaling factor on one or more servers hosting the virtual application 214. The one or more servers can refer to the data processing system 202 hosting the virtual computing environment 212, or an application vendor device 232 providing a backend service or functionality for hosting the virtual application 214.

The command generator 210 can access a policies 224 data structure storing one or more rules or instructions to apply an action stored in the actions 228 data structure based on a threshold stored in the thresholds 226 data structure. For example, the command generator 210 can access a policy 224 that includes comparing the overall computing experience score with a threshold 226. If the overall computing experience score is greater than the threshold 226, the policy can indicate to select an action 228.

The command generator 210 can access a policy 224 with multiple thresholds. For example, the command generator 210 can determine the overall computing experience score is greater than a first threshold. Responsive to the overall computing experience score being greater than the first threshold, the command generator 210 can identify a virtual application of the plurality of virtual applications having the application interaction score greater than a second threshold. For example, the command generator 210 can determine which virtual application 214 has an application interaction score greater than the second threshold by accessing the application data 218 to compute the application score for each application based on the application interaction factors, as in Function 1. The command generator 210, upon identifying the virtual application 214 with the application interaction score greater than the second threshold, can perform the action 228 on the selected virtual application 214 to improve a subsequent application interaction score generated based on a subsequent performance of the virtual application 214.

The command generator 210 can classify a user experience as being negative based on the overall computing experience score, as determined in Function 2. In some cases, the session experience score can be positive based on the session related factors. However, due to the application interaction score or aggregated application interaction score, the combined computing experience score or overall computing experience score may be negative. Thus, the command generator 210 can determine the overall computing experience is negative, even though the session experience may be positive or satisfactory, due to a negative application interaction score.

Figure 3:
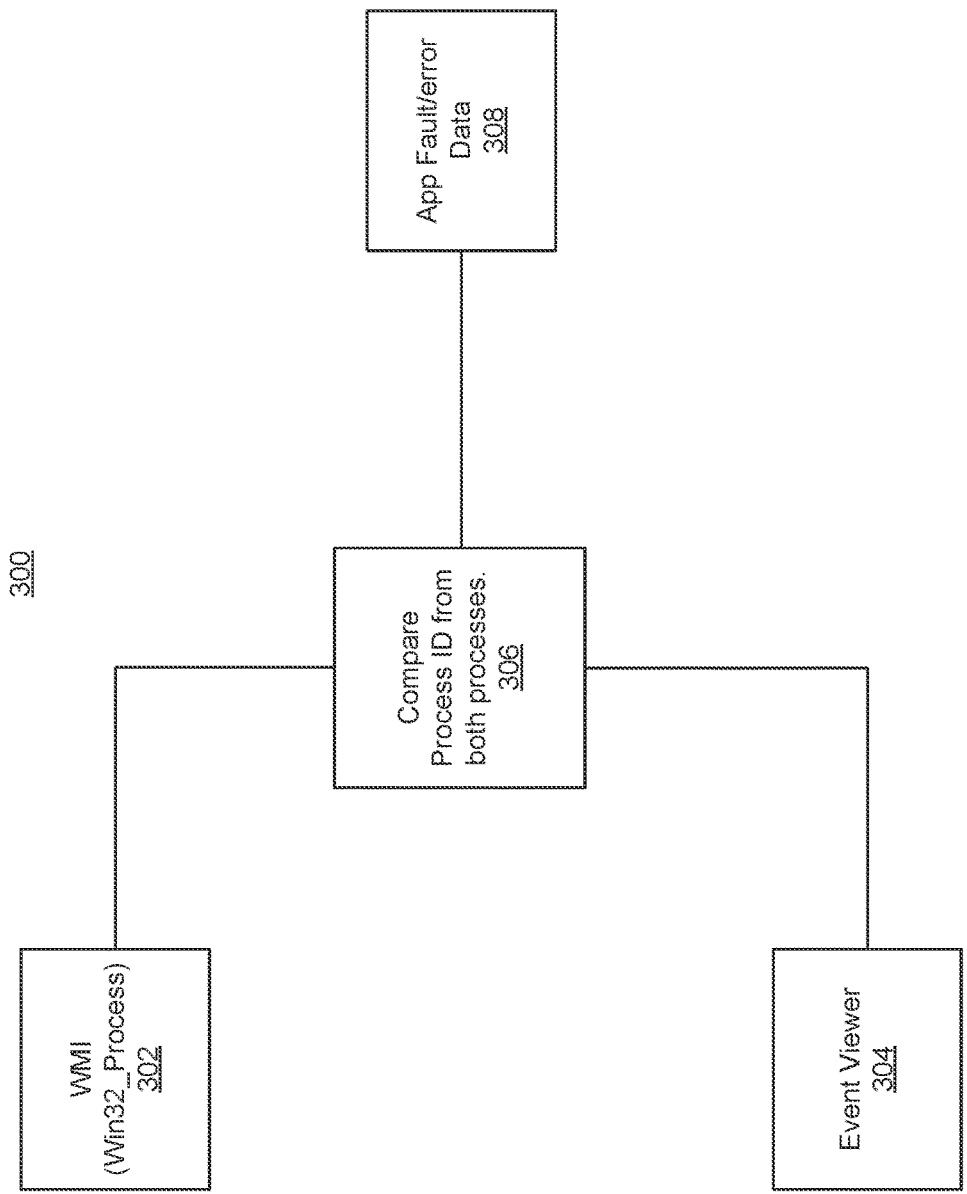
FIG. 3 depicts an example flow diagram of a process for relating an application fault or error with a session key, in accordance with an implementation.

FIG. 3 depicts an example flow diagram of a process for relating an application fault or error with a session key, in accordance with an implementation. The process 300 can be performed by one or more component or system depicted in FIG. 1A, 1B or 2, including, for example, a data processing system. In brief overview, the process 300 can include the data processing system collecting WMI process data at ACT 302 and collecting event viewer data at ACT 304. At ACT 306, the data processing system can compare the process identifier from both processes. At ACT 308, the data processing system can detect the application with a fault or error, and obtain any the corresponding data.

Still referring to FIG. 3, and in further detail, the data processing system can collect process data at ACT 302. The data processing system can collect the process data at intervals of 30 seconds for every 5 minute period, and store the data as application data. The data processing system can collect all process data associated with a session. For example, the process data can refer to a Windows Management Instrumentation process data. The process data can refer to any management tool or application integrated with an operating system provided via the virtual computing environment 212 to obtain information about the state of the operating system and data associated with the operating system. The process data can include a process identifier ("ID").

At ACT 304, the data processing system can collect event viewer data. The event viewer can refer to an application, script, program or other tool that executes or is part of the operating system provided via the virtual computing environment 212 to detect and store information associated with events associated with applications executing in the operating system. The event viewer can include or store a log of application and system messages or notifications, which can include errors, information messages and warnings. Each error, notification, or warning in the event viewer can include a corresponding process ID.

At ACT 306, the data processing system can compare the process ID from the process data collected at ACT 302 with the process ID from the logs in the event viewer collected at ACT 304. The data processing system can determine a match between the process identifiers. The match can be an exact match between the process identifiers. In some cases, the data processing system can perform a translation or conversion between process IDs in order to put the process IDs in a common format prior to performing the match.

At ACT 308, and responsive to detecting the matching process identifier, the data processing system can determine which application has the fault or error, as indicated by the event viewer data. The data processing system can further determine a subset of the process data collected at ACT 302 that corresponds to the fault or error indicated in the logs from the event viewer.

Figure 4:
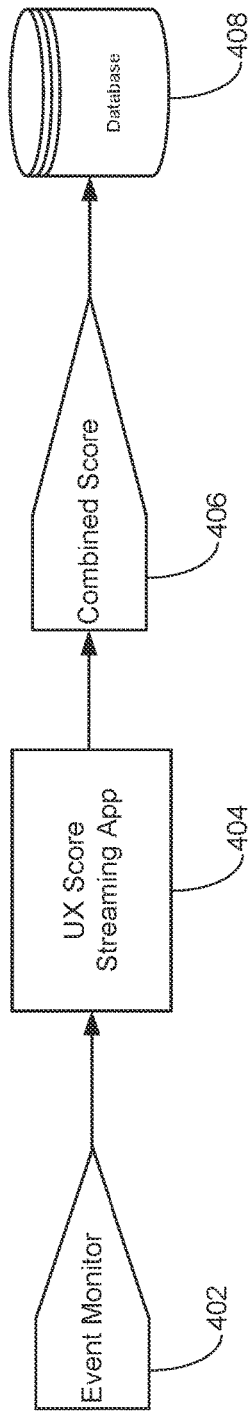
FIG. 4 depicts an example operational flow diagram for integrating the application interaction score with the session experience score, in accordance with an implementation.

FIG. 4 depicts an example operational flow diagram for integrating the application interaction score with the session experience score, in accordance with an implementation. The process 400 can be performed by one or more system or component depicted in FIG. 1A, 1B or 2, including, for example, a data processing system. In brief overview, the process 400 can include the data processing system providing an event monitor at ACT 402. At ACT 404, the data processing system can obtain a user experience score for the streaming application of virtual application. At ACT 406, the data processing system can obtain a session score. At ACT 408, the data processing system can store the session score in a database.

Still referring to FIG. 4, and in further detail, the data processing system can obtain data from an event monitor at ACT 402. The event monitor can be a plugin that executes or operates in a virtual computing environment with which a client computing device establishes a session. The virtual computing environment can be hosted by one or one or more servers, such as a data processing system or an application vendor server. Using the event monitor, the data processing system can obtain process data and event log information in order to detect errors or faults in virtual applications executing in the virtual computing environment. The data processing system can also obtain, via the event monitor, for example, information about the state of the session.

For example, the data processing system can have an event monitor with new events: xd.BrokerApplicationStartFailed, xd.ApplicationLaunchFailureData. The data processing system can read these new events from a streaming application.

At ACT 404, the data processing system can determine an application score. The application score can refer to a user experience ("UX") score for the streaming application. The streaming application can refer to a virtual application. The data processing system can determine the UX score for the streaming application using Function 1, for example.

For example, the data processing system can take an (xd.BrokerApplicationStartFailed, xd.ApplicationLaunchFailureData) event and use this event data to calculate a failure rate and error/fault rate of a virtual application. The data processing system can use this failure rate and error/fault rate to determine a score for the virtual application (e.g., application interaction score).

At ACT 406, the data processing system can integrate the application score with the session score to output a combined score. The combined score can combine a session score with the application interaction score. The data processing system can store the combined score in the database at ACT 408.

The data processing system can add the application interaction score from ACT 404 with a weight to determine a new session experience score at ACT 406. Thus, the new session experience score determined at ACT 406 can be based on the application interaction score. The new session experience score (or combined score) will be impacted by the application interaction score.

Figure 5:
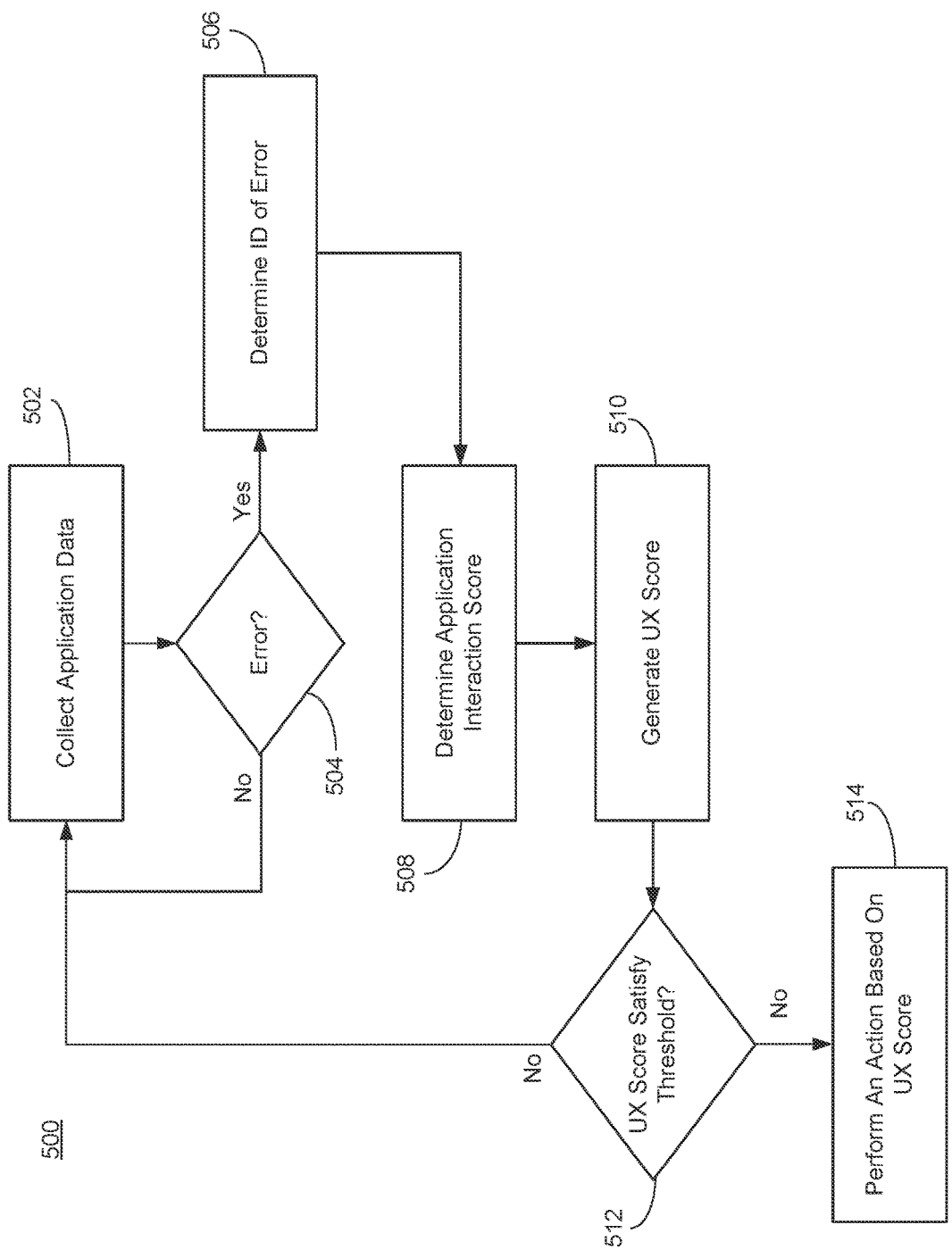
FIG. 5 depicts an example flow diagram of a method for managing virtual application performance in a virtual computing environment, in accordance with an implementation.

FIG. 5 depicts an example flow diagram of a method for managing virtual application performance in a virtual computing environment, in accordance with an implementation. The method 500 can be performed by one or more component or system of FIG. 1A, 1B, or 2, including, for example, a data processing system. In brief overview, the data processing system can collect application data at ACT 502. At decision block 504, the data processing system can determine whether there is an error. At ACT 506, the data processing system can determine an identifier ("ID") associated with the error. At Act 508, the data processing system can determine an application interaction score. At ACT 510, the data processing system can generate a user experience ("UX") score. At ACT 512, the data processing system can determine whether the UX score satisfies a threshold. At ACT 514, the data processing system can perform an action based on the UX score.

Still referring to FIG. 5, and in further detail, the data processing system can collect application data at ACT 502. The data processing system can collect process data, such as WMI process data, as well as other information regarding a state of a virtual application executing in a virtual computing environment. The data processing system can collect information regarding a state of a session. For example, the data processing system can receive the data via an event monitor or plugin of the virtual computing environment. The data processing system can collect the data based on a time interval, continuously, periodically, responsive to a request, or based on other condition or event. The data processing system can collect the data from one or more agent, monitor, script or program associated with the virtual computing environment, data processing system, client computing device, or application vendor device.

At decision block 504, the data processing system can determine whether there is an error. The data processing system can detect whether there is an error based on a notification, warning or error message stored in an event viewer application or tool of the operating system provided via the virtual computing environment. If the data processing system determines that an error, failure, or other fault associated with the virtual application has occurred, the data processing system can proceed to ACT 506. If, however, the data processing system determines that no error or fault has occurred, the data processing system can return to ACT 502 to continue collecting application data.

At ACT 506, the data processing system can determine an identifier ("ID") associated with the error. The identifier can refer to a process ID associated with the virtual application having the error. For example, upon identifying the error, fault or failure via the event viewer, the data processing system can determine the corresponding process ID. The data processing system can then perform a lookup or other search in the application data to identify the corresponding process ID and associated data in order to access the corresponding collected application data.

At Act 508, the data processing system can determine an application interaction score. Using the corresponding collected application data determined based on the matching process ID, the data processing system can determine one or more application interaction factors. The data processing system can determine an application interaction score based on the one or more application interaction factors using, for example, Function 1.

At ACT 510, the data processing system can generate a user experience ("UX") score. The data processing system can determine an aggregated application interaction score associated with one or more virtual applications in the session. The data processing system can determine a session experience score based on information associated with the session. The data processing system can combine the aggregated interaction score (or application interaction score) with the session experience score to determine an overall user experience score using, for example, Function 2.

At ACT 512, the data processing system can determine whether the UX score satisfies a threshold. The data processing system can apply one or more rules or policies to the UX score to determine whether to perform an action. For example, if the UX score is less than the threshold, then the data processing system can determine not to perform a remedial action, and return to ACT 502 to collect data. However, if the UX score is greater than the threshold, the data processing system can proceed to ACT 514 determine to perform a remedial action to improve performance of the user experience.

In some cases, if the UX score is greater than the threshold, the data processing system can then determine whether the session score is greater than a session threshold and whether the aggregated application score is greater than an application threshold. If the session score is less than the session threshold, the data processing system can determine that the cause of the poor performance is due to an application. The data processing system can then determine which application has an application interaction score that is less than the application threshold. For example, the data processing system can determine the application interaction score for each virtual application, and compare the individual application interaction scores with the application threshold. Upon determine the virtual application associated with the application interaction score greater than the application threshold, the data processing system can determine to perform an action to improve performance associated with the virtual application.

At ACT 514, the data processing system can perform an action based on the UX score. The action can include, for example, changing a version of the virtual application, patching the virtual application, or adjusting a scaling factor on the one or more servers hosting the virtual application.

The data processing system can determine the action to perform based on which action is available. For example, if there is no other version of the virtual application, then the data processing system can determine to not perform the action to change the version. If a newer version of the application is available, the data processing system can determine to upgrade the virtual application version. If the application interaction score increased subsequent to upgrading the virtual application version, but the score was satisfactory prior to the upgrade, then the data processing system can determine to rollback the version of the virtual application, in the event the prior version is still compatible with the virtual computing environment or operating system. The data processing system can determine which version of the application has the lowest application interaction score, and switch to that version of the application.

If the one or more servers has more capacity, the data processing system can determine to increase a scaling factor. In some cases, the data processing system can determine the application interaction factor contributing to the high application interaction score. If the factor relates to latency or delay in the application due to lack of processor availability or memory availability, then the data processing system can increase process or memory availability. If the factor that resulted in the high application interaction score relates to a lack of sufficient licenses for the application, then the data processing system can provide a message to an administrator of the virtual application or virtual computing environment or client computing device to suggest purchasing additional licenses. Thus, the data processing system can perform one or more actions to improve performance of the user experience based on issues associated with the virtual application.

The above-mentioned elements or entities may be implemented in hardware, or a combination of hardware and software, in one or more embodiments. Components may be implemented using hardware or a combination of hardware or software detailed above in connection with FIGS. 1A-1B. For instance, these elements or entities can include any application, program, library, script, task, service, process or any type and form of executable instructions executing on hardware of a device. The hardware includes circuitry such as one or more processors in one or more embodiments.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

It will be further understood that various changes in the details, materials, and arrangements of the parts that have been described and illustrated herein may be made by those skilled in the art without departing from the scope of the following claims.

What is claimed is:

1. A method of managing virtual application performance in a virtual computing environment, comprising:
   determining, by one or more processors, for each of a plurality of virtual applications accessed during each of a plurality of sessions, an application interaction score based at least in part on a corresponding plurality of application interaction factors for the plurality of sessions;
   generating, by the one or more processors, for each session of the plurality of sessions, an aggregated application interaction score based at least on combining the application interaction score for each of the plurality of virtual applications accessed during a corresponding session of the plurality of sessions;
   selecting, by the one or more processors, based at least in part on the aggregated application interaction score, an action from a plurality of actions to improve performance of at least one of the plurality of virtual applications accessed via the virtual computing environment, wherein the selected action is at least one of: changing a version of a virtual application of the plurality of virtual applications, patching the virtual application, or adjusting a scaling factor on one or more servers hosting the virtual application;
   generating, by the one or more processors, an instruction that when executed performs the selected action to improve performance of the at least one of the plurality of virtual applications accessed via the virtual computing environment; and
   executing, by the one or more processors, the instruction causing the selected action to be performed.

2. The method of claim 1, wherein the plurality of application interaction factors comprise at least one of application launch failure, application faults and crashes, application responsiveness, or application launch time.

3. The method of claim 1, comprising:
   combining, by the one or more processors, for each session of the plurality of sessions, a session experience score with the aggregated application interaction score to generate a combined computing experience score for each session of the plurality of sessions; and
   determining, by the one or more processors, an overall computing experience score based at least in part on aggregating the combined computing experience score for each session of the plurality of sessions;
   wherein selecting the action is based at least in part on the overall computing experience score.

4. The method of claim 3, wherein the session experience score is determined based at least in part on a logon duration, input/output round trip time, connection failure, or session reconnects.

5. The method of claim 1, comprising:
   identifying, by the one or more processors, a weight for each of the plurality of application interaction factors;
   applying, by the one or more processors, the weight corresponding to each of the plurality of application interaction factors to generate a plurality of weighted application factors; and
   determining, by the one or more processors, the application interaction score based on the plurality of weighted application factors.

6. The method of claim 1, comprising:
   identifying, by the one or more processors, a session weight and an application weight;
   applying, by the one or more processors, the session weight to a session experience score, and applying the application weight to the aggregated application interaction score; and
   generating, by the one or more processors, a combined computing experience score for each session of the plurality of sessions based on the weighted session experience score and the weighted aggregated application interaction score.

7. The method of claim 1, comprising:
combining, by the one or more processors, for each session of the plurality of sessions, a session experience score with the aggregated application interaction score to generate a combined computing experience score for each session of the plurality of sessions;
determining, by the one or more processors, an overall computing experience score based at least in part on aggregating the combined computing experience score for each session of the plurality of sessions;
comparing, by the one or more processors, the overall computing experience score with a threshold; and
wherein selecting the action is based at least in part on the comparison of the overall computing experience score with the threshold.

8. The method of claim 1, comprising:
combining, by the one or more processors, for each session of the plurality of sessions, a session experience score with the aggregated application interaction score to generate a combined computing experience score for each session of the plurality of sessions;
determining, by the one or more processors, an overall computing experience score based at least in part on aggregating the combined computing experience score for each session of the plurality of sessions;
determining, by the one or more processors, the overall computing experience score is greater than a first threshold;
identifying, by the one or more processors, responsive to the overall computing experience score greater than the first threshold, a virtual application of the plurality of virtual applications having the application interaction score greater than a second threshold; and
performing, by the one or more processors, the selected action for the identified virtual application to improve a subsequent application interaction score generated based on a subsequent performance of the virtual application.

9. The method of claim 1, comprising:
combining, by the one or more processors, for each session of the plurality of sessions, a session experience score with the aggregated application interaction score to generate a combined computing experience score for each session of the plurality of sessions;
determining, by the one or more processors, an overall computing experience score based at least in part on aggregating the combined computing experience score for each session of the plurality of sessions; and
classifying, by the one or more processors, a user experience as being negative based on the overall computing experience score, wherein the session experience score for each session of the plurality of sessions indicates a positive user experience.

10. The method of claim 1, comprising:
collecting, by the one or more processors, process data at a time interval for processes in a session of the plurality of sessions in the virtual computing environment;
detecting, by the one or more processors, in the process data, an error in the process data;
identifying, by the one or more processors responsive to detection of the error, an application in an event viewer having an indication of the error;
extracting, by the one or more processors, a portion of the process data corresponding to the application with the error; and
generating, by the one or more processors, at least a portion of the plurality of application interaction factors based at least in part on the portion of the process data corresponding to the application with the error.

11. A system to manage virtual application performance in a virtual computing environment, comprising:
one or more processors and memory to:
determine, for each of a plurality of virtual applications accessed during each of a plurality of sessions, an application interaction score based at least in part on a corresponding plurality of application interaction factors for the plurality of sessions;
generate, for each session of the plurality of sessions, an aggregated application interaction score based at least on combining the application interaction score for each of the plurality of virtual applications accessed during a corresponding session of the plurality of sessions;
select, based at least in part on the aggregated application interaction score, an action from a plurality of actions to improve performance of at least one of the plurality of virtual applications accessed via the virtual computing environment, wherein the selected action is at least one of: changing a version of a virtual application of the plurality of virtual applications, patching the virtual application, or adjusting a scaling factor on one or more servers hosting the virtual application;
generate an instruction that when executed performs the selected action to improve performance of the at least one of the plurality of virtual applications accessed via the virtual computing environment; and
execute the instruction causing the selected action to be performed.

12. The system of claim 11, wherein the plurality of application interaction factors comprise at least one of application launch failure, application faults and crashes, application responsiveness, or application launch time.

13. The system of claim 11, wherein the one or more processors are further configured to:
combine, for each session of the plurality of sessions, a session experience score with the aggregated application interaction score to generate a combined computing experience score for each session of the plurality of sessions; and
determine an overall computing experience score based at least in part on aggregating the combined computing experience score for each session of the plurality of sessions;
wherein selecting the action is based at least in part on the overall computing experience score.

14. The system of claim 13, wherein the session experience score is determined based at least in part on a logon duration, input/output round trip time, connection failure, or session reconnects.

15. The system of claim 11, wherein the one or more processors are further configured to:
identify a weight for each of the plurality of application interaction factors;
apply the weight corresponding to each of the plurality of application interaction factors to generate a plurality of weighted application factors; and
determine the application interaction score based on the plurality of weighted application factors.

16. The system of claim 11, wherein the one or more processors are further configured to:

identify a session weight and an application weight;
apply the session weight to a session experience score, and applying the application weight to the aggregated application interaction score; and
generate a combined computing experience score for each session of the plurality of sessions based on the weighted session experience score and the weighted aggregated application interaction score.

17. The system of claim 11, wherein the one or more processors are further configured to:
combine, for each session of the plurality of sessions, a session experience score with the aggregated application interaction score to generate a combined computing experience score for each session of the plurality of sessions;
determine an overall computing experience score based at least in part on aggregating the combined computing experience score for each session of the plurality of sessions;
compare the overall computing experience score with a threshold; and
wherein selecting the action is based at least in part on the comparison of the overall computing experience score with the threshold.

18. The system of claim 11, wherein the one or more processors are further configured to:
combine, for each session of the plurality of sessions, a session experience score with the aggregated application interaction score to generate a combined computing experience score for each session of the plurality of sessions;
determine an overall computing experience score based at least in part on aggregating the combined computing experience score for each session of the plurality of sessions;
determine the overall computing experience score is greater than a first threshold;
identify, responsive to the overall computing experience score greater than the first threshold, a virtual application of the plurality of virtual applications having the application interaction score greater than a second threshold; and
perform the selected action for the identified virtual application to improve a subsequent application interaction score generated based on a subsequent performance of the virtual application.

19. A non-transitory computer-readable medium storing processor executable instructions that, when executed by one or more processors, manage virtual application performance in a virtual computing environment, the instructions comprising instructions to:
determine, for each of a plurality of virtual applications accessed during each of a plurality of sessions, an application interaction score based at least in part on a corresponding plurality of application interaction factors for the plurality of sessions;
generate, for each session of the plurality of sessions, an aggregated application interaction score based at least on combining the application interaction score for each of the plurality of virtual applications accessed during a corresponding session of the plurality of sessions;
select, based at least in part on the aggregated application interaction score, an action from a plurality of actions to improve performance of at least one of the plurality of virtual applications accessed via the virtual computing environment, wherein the selected action is at least one of: changing a version of a virtual application of the plurality of virtual applications, patching the virtual application, or adjusting a scaling factor on one or more servers hosting the virtual application;
generate an instruction that when executed performs the selected action to improve performance of the at least one of the plurality of virtual applications accessed via the virtual computing environment; and
execute the instruction causing the selected action to be performed.

20. The computer-readable medium of claim 19, wherein the instructions further comprise instructions to:
combine, for each session of the plurality of sessions, a session experience score with the aggregated application interaction score to generate a combined computing experience score for each session of the plurality of sessions; and
determine an overall computing experience score based at least in part on aggregating the combined computing experience score for each session of the plurality of sessions;
wherein selecting the action is based at least in part on the overall computing experience score.

* * * * *